(12) United States Patent
Neumann et al.

(10) Patent No.: US 8,066,455 B2
(45) Date of Patent: Nov. 29, 2011

(54) CONNECTION SYSTEM FOR TWO TOOL PARTS

(75) Inventors: Jens Neumann, Wernshausen (DE); Peter Frank, Floh-Seligenthal (DE)

(73) Assignee: Sandvik Intellectual Property AB, Sandviken (SE)

( * ) Notice: Subject to any disclaimer, the term of this patent is extended or adjusted under 35 U.S.C. 154(b) by 414 days.

(21) Appl. No.: 11/152,250

(22) Filed: Jun. 15, 2005

(65) Prior Publication Data

US 2006/0008336 A1  Jan. 12, 2006

(30) Foreign Application Priority Data

Jun. 21, 2004 (DE) .......................... 10 2004 029 974

(51) Int. Cl.
*B23C 5/20* (2006.01)
*B23B 29/03* (2006.01)

(52) U.S. Cl. .............. 409/234; 82/160; 407/46; 407/11; 403/361; 403/408.1

(58) Field of Classification Search .................. 409/232, 409/233, 234, 135–136; 83/651, 698.11; 82/160, 158; 407/46, 11, 34; 403/350, 322.1, 403/361, 408.1, 351, 352; 279/8; 408/239 A; 285/374, 321, 330, 308

See application file for complete search history.

(56) References Cited

U.S. PATENT DOCUMENTS

| | | | | |
|---|---|---|---|---|
| 2,893,769 A * | 7/1959 | Deliso | ......................... | 403/359.6 |
| 2,995,963 A * | 8/1961 | Lavallee | ....................... | 408/233 |
| 4,834,597 A | 5/1989 | Andersson et al. | | |
| 5,026,224 A * | 6/1991 | Andersson et al. | ........... | 409/234 |
| 5,551,811 A * | 9/1996 | Satran et al. | ..................... | 407/40 |
| 5,555,784 A | 9/1996 | Muendlein et al. | | |
| 5,607,263 A * | 3/1997 | Nespeta et al. | .................. | 407/61 |
| 5,857,811 A | 1/1999 | Kaiser et al. | | |
| 5,957,755 A * | 9/1999 | LaFlamme | ....................... | 407/42 |
| 6,059,492 A * | 5/2000 | Hecht | .......................... | 81/176.2 |
| 6,276,879 B1 * | 8/2001 | Hecht | .......................... | 409/234 |
| 6,394,466 B1 * | 5/2002 | Matsumoto et al. | .......... | 409/234 |
| 6,834,692 B2 * | 12/2004 | Lindsay et al. | ................. | 407/48 |
| 6,932,548 B2 * | 8/2005 | Obrachta | ....................... | 409/234 |
| 6,942,437 B2 * | 9/2005 | Ripley et al. | .................. | 409/234 |
| 6,979,157 B2 * | 12/2005 | Kleiner | .......................... | 409/234 |
| 7,112,021 B2 * | 9/2006 | Pantzar | ......................... | 409/234 |

(Continued)

FOREIGN PATENT DOCUMENTS

CH  690 358 A5  8/2000

(Continued)

OTHER PUBLICATIONS

EPO Website Translation of DE 3738732A.*

(Continued)

*Primary Examiner* — Erica E Cadugan
(74) *Attorney, Agent, or Firm* — Drinker Biddle & Reath LLP

(57) ABSTRACT

A connection system which produces an aligned connection between first and second tool parts includes a spigot projecting from the first tool part, and a spigot-receiving recess formed in the second tool part. The spigot and the recess have correspondingly shaped, non-circular cross-sections. The spigot is not oversized relative to the recess, and may be smaller than the recess, so that the spigot can be inserted into the recess without the recess being expanded or the recess being compressed.

20 Claims, 7 Drawing Sheets

U.S. PATENT DOCUMENTS

| | | | |
|---|---|---|---|
| 7,125,207 B2 * | 10/2006 | Craig et al. | 409/234 |
| 7,131,802 B2 * | 11/2006 | Pantzar | 409/234 |
| 7,270,506 B2 * | 9/2007 | Guy | 409/234 |
| 2003/0210961 A1 * | 11/2003 | Arvidsson | 407/48 |
| 2004/0025969 A1 * | 2/2004 | Lindsay et al. | 144/241 |
| 2004/0037633 A1 | 2/2004 | Kleiner | |

FOREIGN PATENT DOCUMENTS

| | | |
|---|---|---|
| DE | 10 07 144 | 4/1957 |
| DE | 32 34 057 A1 | 3/1984 |
| DE | 37 38 732 A1 | 5/1989 |
| EP | 0 478 239 A1 | 4/1992 |
| EP | 1 336 767 A2 | 8/2003 |
| EP | 1 413 374 A1 | 4/2004 |
| EP | 0 294 348 B1 | 6/2004 |
| JP | 61-30305 | 2/1986 |
| JP | 63-30406 | 2/1988 |
| JP | 7501494 | 2/1995 |
| JP | 2002-18608 | 1/2002 |
| WO | WO 93/10929 | 6/1993 |
| WO | 2004/067213 A1 | 8/2004 |

OTHER PUBLICATIONS

A European Search Report dated Oct. 31, 2005 issued in EP Application No. 05104994.

* cited by examiner

CONNECTION SYSTEM FOR TWO TOOL PARTS

The present application claims priority under 35 U.S.C. §118 to Patent Application Serial No. 10 2004 029 974.9 filed in Germany on Jun. 21, 2004.

BACKGROUND

The present invention relates to a connection system for the aligned connection of two tool parts.

In particular in the case of rotary tools for cutting, there are numerous interfaces between the different tool parts. The alignment in which the two tool parts are attached to each other is often important. If, for example, one of the two tool parts bears a cutting bit, then an exact alignment of the two tool parts to each other is generally necessary in order to achieve a satisfactory cutting result.

Thus for example a connection system is known from U.S. Pat. No. 5,857,811 for the attachment of a cutting edge holder (cutting bit holder) to a tool holder of a boring head. Here, the cutting edge holder has a groove which is fitted onto a correspondingly shaped driving key of the tool holder. Attachment then takes place with the help of a screwed connection. The groove is essentially arranged in the circumferential direction of the tool holder, with the result that by fitting the bit holder onto the tool holder, an alignment or positioning of the cutting bit holder in the axial direction takes place. In the radial direction, on the other hand, the alignment takes place exclusively through the tensioning screw, which can, however, lead to slight misalignments.

It is further provided with this attachment system that the driving key is oversized, i.e., it is larger in cross-section than the groove prior to insertion of the driving key into the groove, with the result that when the cutting bit holder is placed on the driving key and the cutting bit holder is tightened with the help of a tensioning screw, an elastic deformation of the sides of the groove and/or the driving key occurs. That ensures a play-free connection and also makes it possible to transfer cutting forces between the groove and the driving key. However, it proves difficult to subsequently detach the cutting bit holder from the tool holder as, because of the elastic deformation of the groove and/or the key, the bit holder is stuck on the driving key even after the tensioning spring has been loosened. Therefore it is frequently necessary to also provide a push-off mechanism, for example in the form of a screw whose foot pushes the cutting bit holder away from the tool holder when the screw is tightened.

A connection system is already described in U.S. Pat. No. 4,834,597 in which a first tool part has a truncated projection which faces a second tool part, while the second tool part has a seat which is defined by a tapering recess in order to receive the projection of the first part. Furthermore, with this attachment system, devices are provided for clamping the first tool part to the second tool part. Both the projection and the recess have a non-circular cross-section. However, here too the projection is oversized relative to the recess, with the result that when the projection is inserted into the recess there is an elastic expansion of the recess and/or a compression of the projection. In principle an exact alignment of the two tool parts relative to each other is possible with this connection system. Here, too, however it is also not always easy to detach the two tool parts from each other, as, after the tensioning screw has been loosened, the one tool part may be stuck on the second tool part. A suitable push-off device must therefore be present with the help of which the one tool part can be pushed off from the other tool part.

The attachment systems described in the state of the art either do not permit an easy alignment of the two tool parts to each other or are suitable only for relatively large tools in which the additional push-off device can be integrated.

Starting from this state of the art, it is therefore an object of the invention to provide a connection system for the aligned connection of two tool parts which is easy and economical to produce, which makes possible an exact alignment in both the axial and the radial direction and with which the provision of an additional push-off device can be dispensed with.

SUMMARY OF INVENTION

This object is achieved according to the invention by a connection system with means for connecting the two tool parts and means for aligning the two tool parts to each other, the alignment means comprising a spigot with a non-circular cross-section, provided at the first tool part, and a recess provided at the second tool part, which spigot and recess are matched to each other such that, for the alignment of the two tool parts, the spigot can engage in the recess. The cross-section dimension of the spigot is no greater than the cross-section dimension of the recess, as measured prior to the connection of the tool parts. In other words, the driving key is not oversized relative to the recess, so the connection occurs without expanding the recess or compressing the spigot.

In other words, the connection system according to the invention corresponds essentially to the connection system described in U.S. Pat. No. 4,834,597, except that the oversizing has been dispensed with, so there is no expansion of the recess or compression of the spigot. Surprisingly, it was actually shown that even without oversizing, a sufficiently accurate alignment of the two tool parts relative to each other is possible and all the radially and axially acting forces can be diverted onto the one workpiece via the connection means alone. As used herein, the term "spigot" is meant quite generally any projection. It is understood that the spigot could for example also be conical in design.

Specifically, the spigot and the recess therefore serve according to the invention merely for alignment and are not part of a positive and non-positive connection.

It is particularly beneficial if the cross-section dimension of the spigot is smaller than the cross-section dimension of the recess. This ensures that even in the case of manufacturing tolerances and/or temperature gradients occurring inside the tool, which can in turn lead to differences in the expansion behaviour of the individual tool parts, an elastic deformation of the spigot and/or of the recess can be avoided. In every case the one tool can be removed from the other by loosening the attachment means, as the two tool parts do not stick to each other by means of clamp pressing.

In a particularly preferred form, both the spigot and the recess have an essentially elliptical cross-section. The elliptical cross-section is characterized by ease of manufacture, with a very exact alignment of the two tool parts to each other in both axial and radial directions being possible at the same time. In addition, the cross-section can expediently be symmetrical in such a way that the one tool part can be connected to the other tool part in two positions rotated by 180° to each other about the spigot axis.

Furthermore it is advantageous that the spigot has a section with an essentially constant cross-section dimension and an essentially conical section, the conical section being provided at the outer end of the spigot e.g., a bevel. The cone angle of the conical section is advantageously between 1 and 10°, preferably between 1 and 5° and particularly preferably about 3°. The conical section serves as a thread-in cone and simplifies the attachment of the two tool parts to each other.

As was already stated at the outset, the spigot and the recess according to the invention serve less to transmit force, but rather almost exclusively to align the two tool parts to each other. Consequently, the respective contact surfaces of the spigot and the recess can also be made relatively small. This has the advantage that despite the presence of the recess the material is only a little weakened. It is therefore particularly advantageous if the ratio between the length of the spigot and the greatest cross-section of the spigot is less than 1.0, preferably less than 0.5.

In a further, particularly preferred version of the connection system according to the invention, a spacing disk is provided, the spacing disk having on one side a spigot which essentially corresponds to the spigot of the first tool part, and on the other side a recess which essentially corresponds to the recess of the second tool part. The spacing disk, which can optionally be provided in various different thicknesses, therefore makes it possible for the two tool parts to be fitted at various distances, e.g., in the radial direction, to each other.

Furthermore, it is expedient that the means for attaching the two tool parts comprises at least a screw, preferably a countersunk tensioning screw, which is provided, for the attachment of the two tool parts, to pass through a hole in the one tool part and engage a threaded bore in the other tool part. With the help of the screw the two tool parts can therefore be attached to each other after they are aligned with each other through insertion of the spigot into the corresponding recess. It is particularly expedient if the hole is arranged either in the spigot or in the recess and the threaded bore in the respective other part, recess or spigot. This results in a connection system that is very compact overall, as no additional holes or threaded bores need be provided in addition to the spigot or the recess at the connection surface between the two tool parts.

For many applications it may be of advantage that the spigot and the recess each have at least one channel, the two channels corresponding to each other, with the result that in the connected state a fluid, for example a cooling or lubricating fluid, can be transferred from the one tool via the channels into the other tool. By fluid is meant any gaseous or liquid product.

In a further particularly preferred version, the first tool part has an essentially flat bearing surface which surrounds the spigot, and the second tool part has an essentially flat bearing surface which surrounds the recess, the alignment means being developed such that the bearing surfaces of the first and second tool parts enter into contact with each other in the connected state. These bearing surfaces serve firstly to absorb any transverse forces exerted on the one tool part and secondly to provide a stop element, with the result the distance between the two tool parts is determined by these bearing surfaces.

The present invention relates not only to the connection system as such, but equally to the individual tool parts designed accordingly for use in the connection system. In a particularly preferred version, the one tool part is a boring head and the spigot with a non-circular cross-section is provided for the attachment of a cutting bit holder.

The corresponding cutting bit holder then has the corresponding recess with a non-circular cross-section.

In a particularly preferred version, the cutting bit holder can be fitted in two different positions relative to the boring head or to a tool holder provided at the latter. For example, the one position could be provided for forward machining and the other position for backward machining.

Furthermore it is expedient that the boring head has a channel for the supply of coolant and/or lubricant. This channel preferably has two outlets, each outlet being allocated to one of the two fitting positions of the cutting bit holder at the boring head or at the tool holder. In other words, the two outlets of the channel are arranged such that the one outlet ensures a supply of coolant and/or lubricant to the cutting edge of the cutting bit on the cutting bit holder in the one fitting position, while the other outlet ensures a supply of coolant and/or lubricant to the cutting edge in the other fitting position.

It is particularly expedient if the outlets can be closed, e.g. with the help of a headless screw. Thereby, regardless of the chosen fitting position of the cutting bit holder at the tool holder or the boring head, one of the channel outlets, which is not needed for the chosen positioning of the cutting bit, can be closed, which saves coolant and moreover results in less damage to the environment.

BRIEF DESCRIPTION OF THE DRAWINGS

Further advantages, features and application possibilities of the present invention are made clear by the following description of two preferred embodiments of the invention and the associated figures. There are shown in.

DETAILED DESCRIPTION OF PREFERRED EMBODIMENTS

Figure 1:
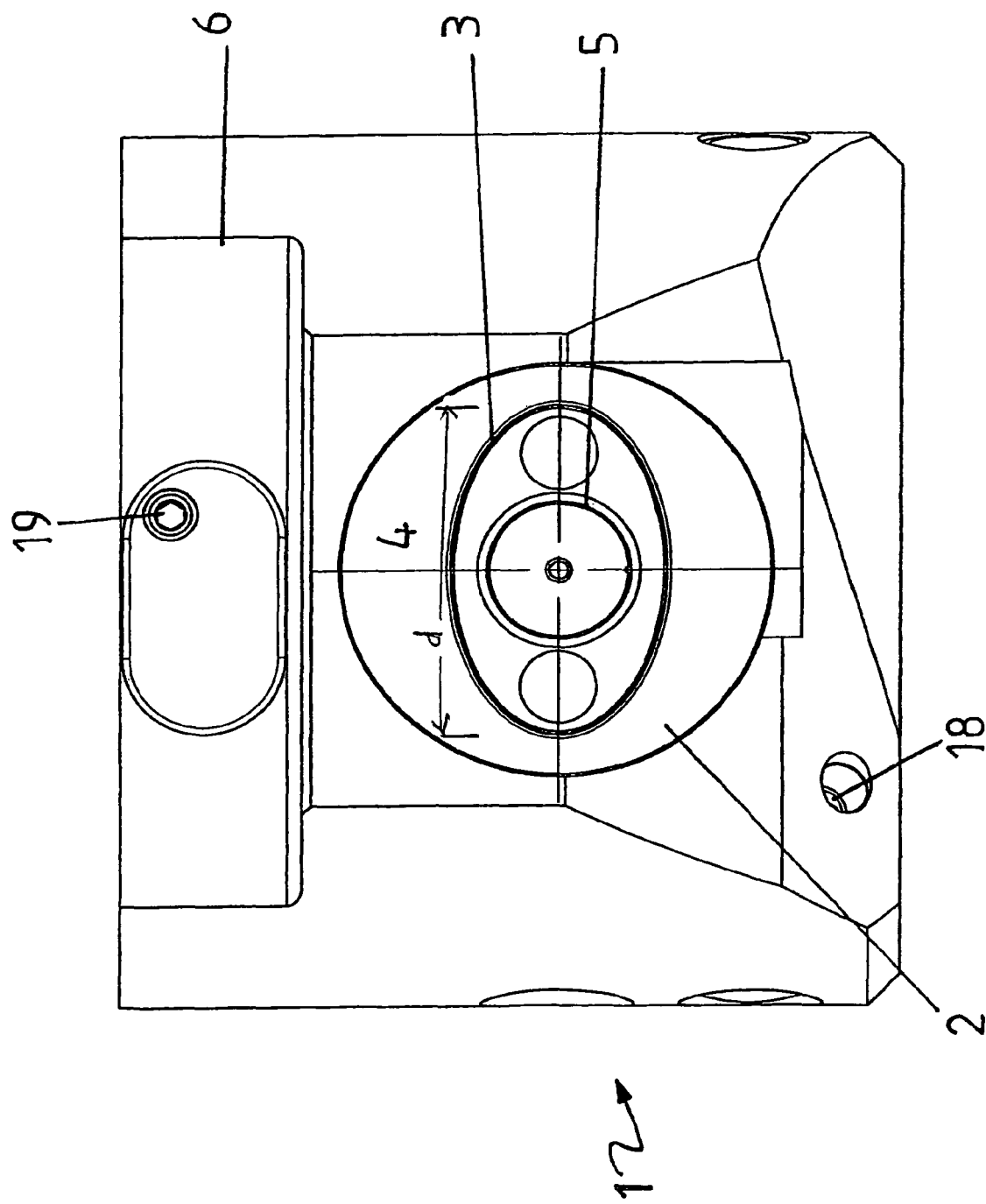
FIG. 1 is a plan view of a boring head according to the invention.

A first version of a boring head 1 according to the invention is shown in FIG. 1. The boring head has an essentially cylindrical shape. Housed in a radial direction in the boring head 1 is a tool part in the form of a tool holder 2, which can be set in a radial direction relative to the boring head 1. The tool holder 2 has a bearing surface 4, in the center of which is arranged an essentially elliptical spigot 3 which projects past the bearing surface 4. Provided in the middle of the elliptical spigot 3 is a threaded bore 5 which serves to attach a cutting bit holder to the tool holder 2.

In its basic body the boring head 1 has a coolant or lubricant channel (not shown). Two optionally closable outlets 18, 19a for coolant and lubricant are also provided. The boring head 1 also has a groove 6 running essentially in the circumferential direction, the function of which will be explained later.

Figure 2:
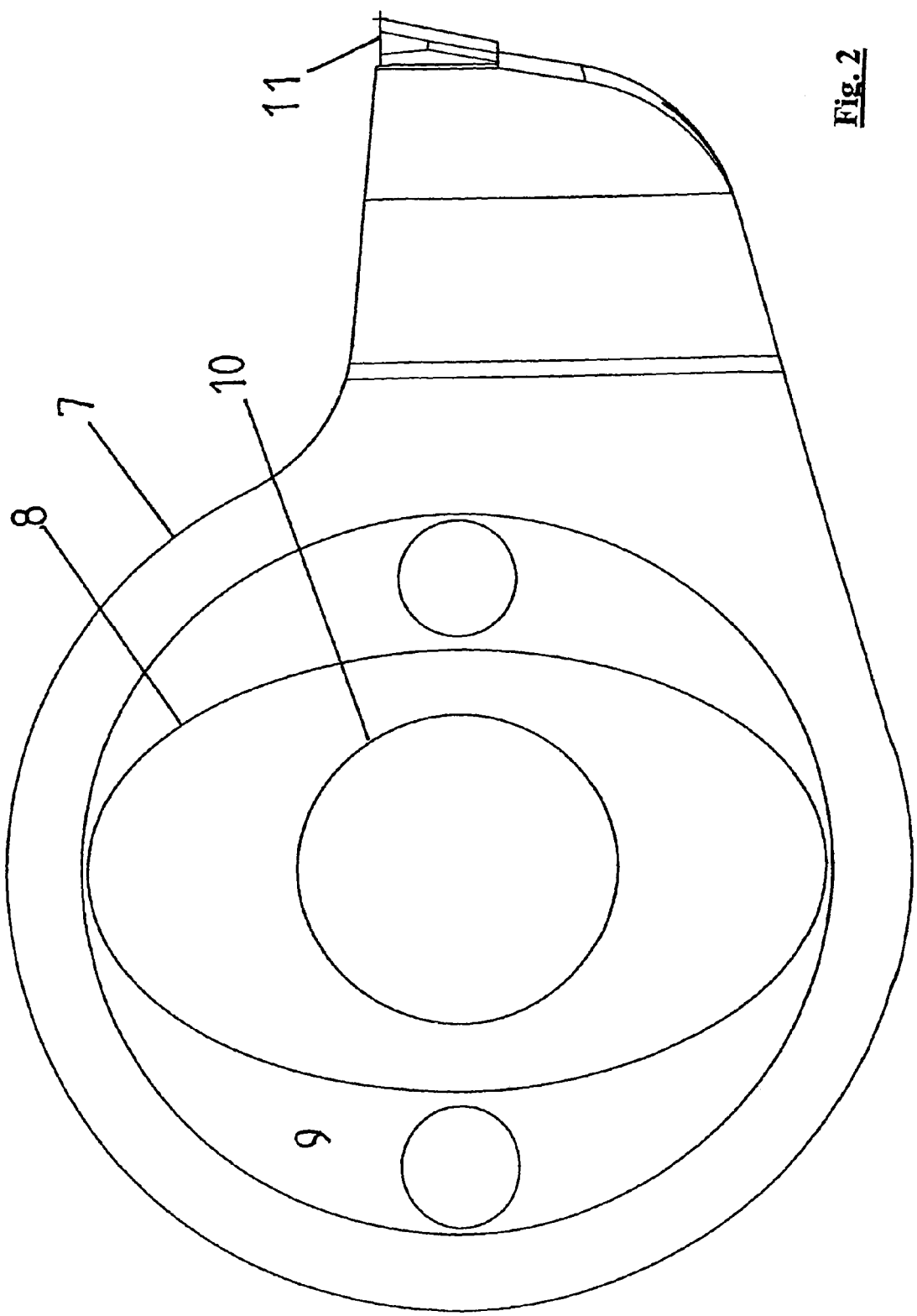
FIG. 2 is a plan view of a cutting bit holder according to the invention.

In FIG. 2, another tool part, in the form of a cutting bit holder 7, is shown which is provided in order to be attached to the boring head 1 shown in FIG. 1. The cutting bit holder 7 bears a cutting bit 11. It also has an essentially elliptical recess or trough 8. This recess 8 is surrounded by a bearing surface 9. A through-hole 10 is also provided which is arranged inside the recess 8.

Figure 3:
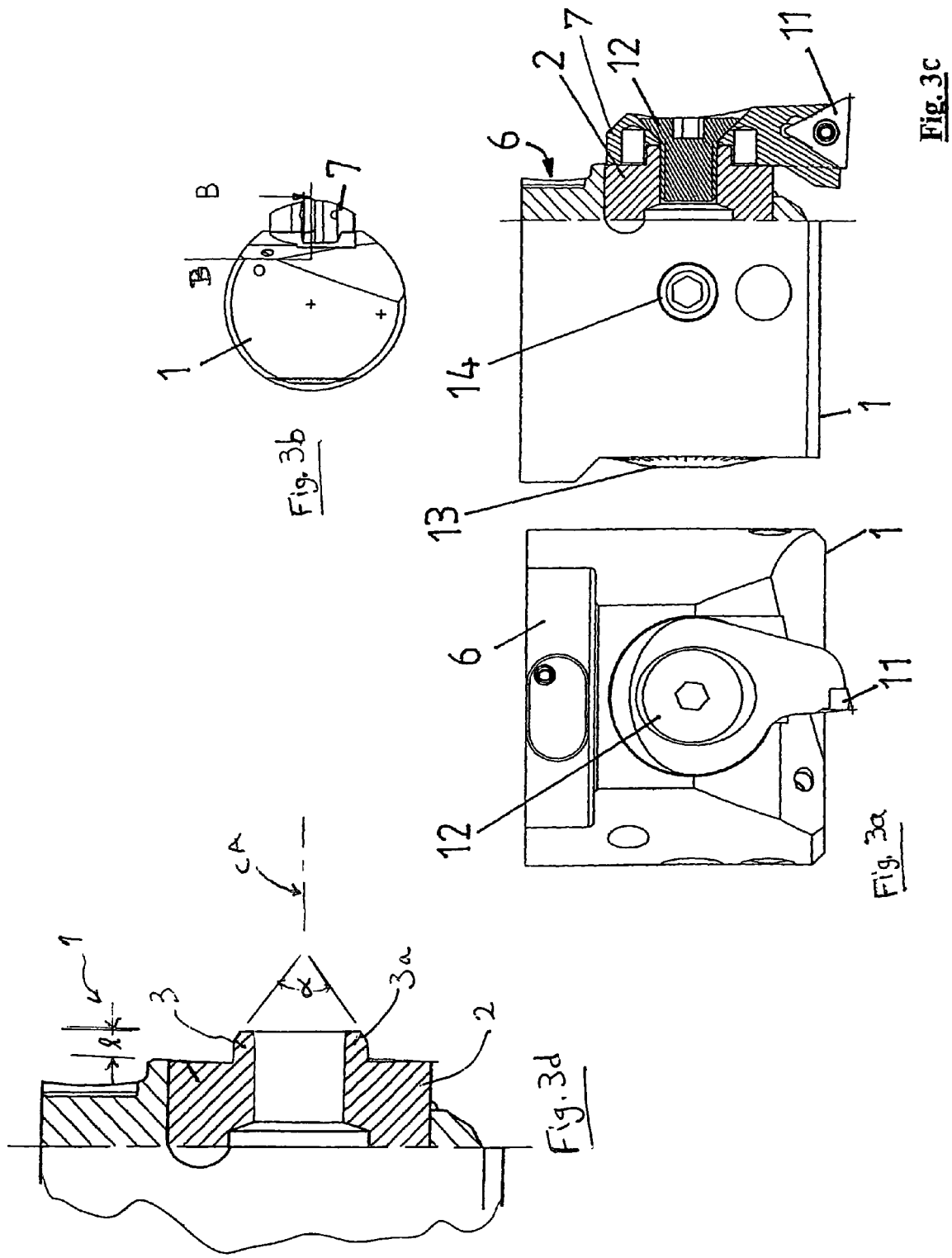
FIG. 3a is a front view of the boring head with the cutting bit holder mounted therein.
FIG. 3b is a bottom plan view of the boring head and cutting bit holder of FIG. 3a, FIG. 3c is a side view, partly in section taken along the line B-B in FIG. 3b.
FIG. 3d is an enlarged fragmentary view of FIG. 3c.

Three different views of the boring head 1 with fitted cutting bit holder 7 of FIGS. 1 and 2 are shown in FIGS. 3a-3c. In FIG. 3b, a front view of the boring head 1 with fitted bit holder 7 can be seen. FIG. 3a corresponds essentially to the view of FIG. 1, but here the cutting bit holder 7 with the cutting bit 11 is fitted to the boring head 1. The securing of the cutting bit holder 7 to the boring head 1 takes place with the help of a fastener in the form of a tensioning screw 12, which passes through the hole 10 in the cutting bit holder 7 and threadedly engages the threaded bore 5 in the boring head 1.

The illustration in FIG. 3c shows a side view of the boring head 1. Here, however, the boring head 1 has been rotated by 90° compared with the view shown in FIG. 3a. Also, the right-hand part in FIG. 3c is a sectional view taken along the line B-B which is drawn in FIG. 3b.

An adjustment screw 13, with the help of which the tool holder 2 can be moved in radial direction (i.e., right-to-left in FIG. 3c) can be seen at the left in FIG. 3c. As soon as the tool holder 3 is in its desired radial position, the tool holder 2 can be fixed in place by the fixing screw 14. It is clear from the sectional view of FIG. 3c that the cutting bit holder 7 is attached to the tool holder 2 with the help of the tensioning screw 12. In this view also, the groove-shaped recess 6 can be seen. In this figure, it becomes clear that the groove-shaped recess 6 allows the cutting bit holder 7 to be attached to the tool holder 2 in two different positions rotated by 180° (compare FIGS. 4 and 5).

Figure 4:
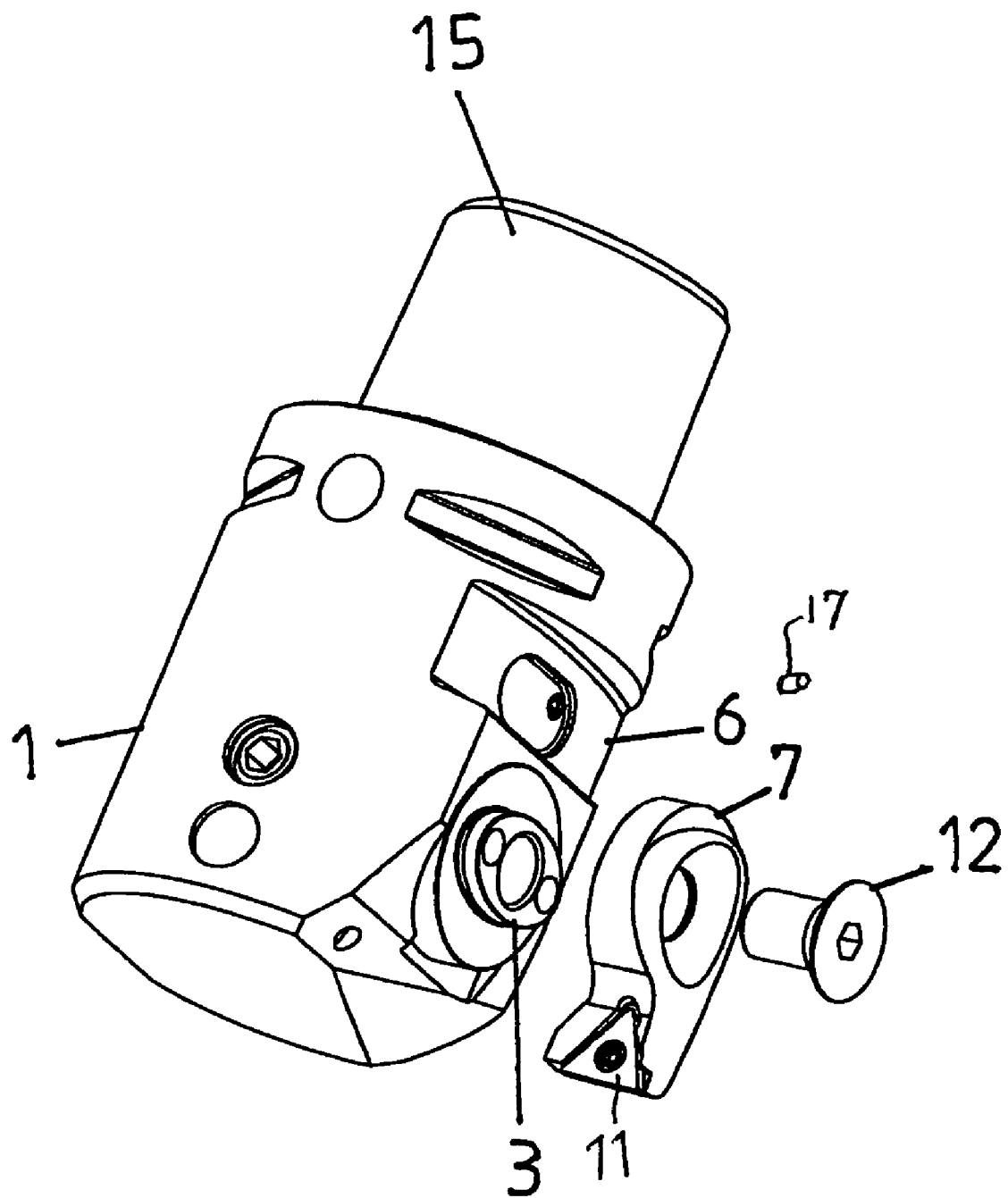
FIG. 4 shows a perspective exploded view of the boring head of FIG. 1 in a first fitting position.

A perspective exploded view is shown in FIG. 4 by way of illustration in which the cutting bit holder 7 with the cutting bit 11 housed therein is oriented in the first mounting position. The essentially elliptical spigot 3, which projects past the bearing surface of the tool holder 2, can be clearly seen. The cutting bit holder 7 has its corresponding elliptical recess, which cannot be seen in this figure, fitted onto the tool holder 2, and attached with the help of the tensioning screw. In this position, the boring head can be used in a forward direction, i.e., advanced in a direction from top left to bottom right in FIG. 4.

The spigot and the recess are sized to enable the spigot to be inserted into the recess without expanding the recess or compressing the spigot (i.e., the spigot is not oversized). Thus, the tool parts 2, 7 will not become stuck together so no push-off device (described earlier) is needed. The spigot could be of smaller cross-section than the recess, so that the spigot is spaced from the surface that defines the recess.

It has been found, somewhat surprisingly, that even without oversizing the spigot, it was possible to accurately align the tool parts 2, 7 relative to one another. Also, forces acting radially and/or axially could be adequately transferred via the connecting fastener 12 alone.

An outer end of the spigot 3 could be conical or beveled at 3a, the bevel forming an apex angle α of 1-10°, preferably 1-5°, more preferably about 3° (see FIG. 3d). The rest of the spigot, as seen in a cross-sectional plane containing the center axis CA of the spigot/recess, could be of constant cross-section.

Preferably, the ratio of the longest cross-section d of the spigot 3 (FIG. 1) to the length l of the spigot (FIG. 3d) is less than 1.0, more preferably less than 0.5. Those ratios also apply to the recess 8 that receives the spigot.

Figure 5:
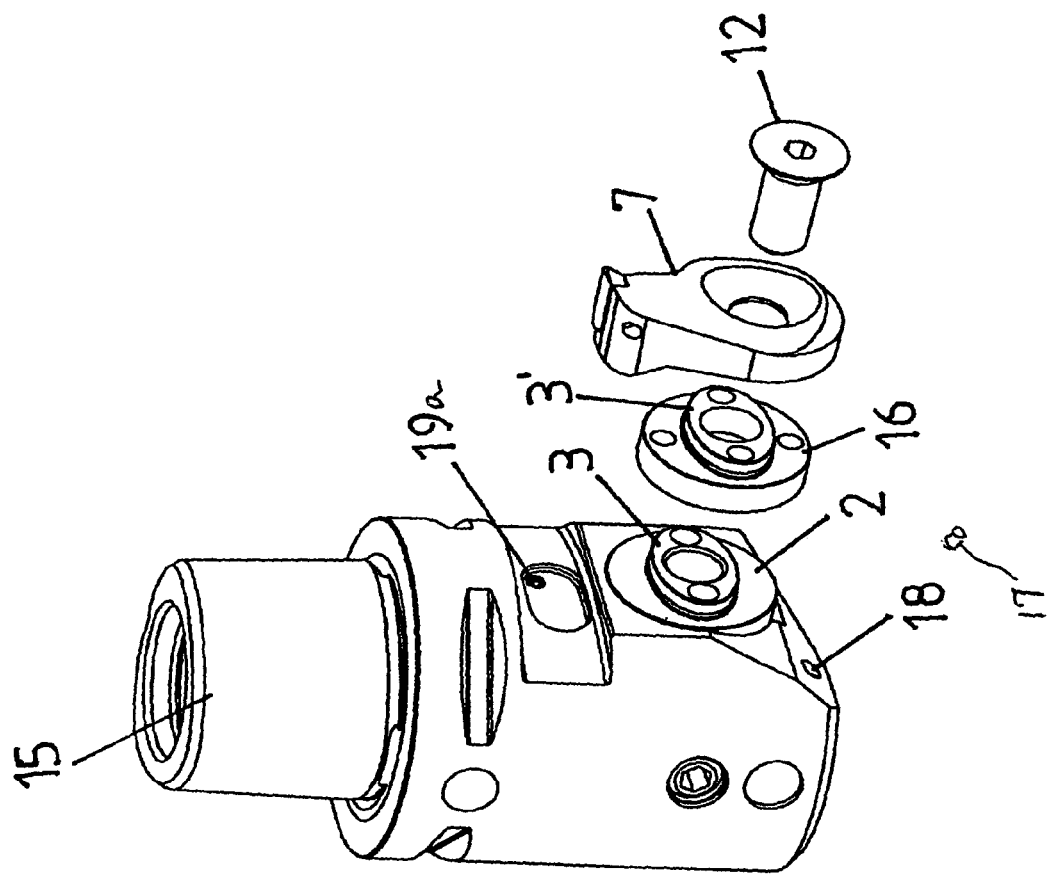
FIG. 5 is a perspective exploded view of the boring head of FIG. 1 in a second fitting position.

FIG. 5 shows a perspective exploded view of the boring head 1, in which the cutting bit holder 7 is oriented in its second attachment position. It is seen that, compared with the orientation which is shown in FIG. 4, the cutting bit holder 7 has been rotated by 180°.

Generally speaking, the boring head including the groove-like recess 6 could be developed such that the cutting bit holder 7 could be fitted in its second position directly onto the elliptical spigot of the tool holder 2. However, as the presence of the groove-shaped recess 6 contributes to a substantial weakening of the basic body of the boring head 1, a tool part in the form of a spacing disk 16 is used in the FIG. 5 position which in principle serves as an extension of the tool holder.

The spacing disk 16 has, on its side facing the tool holder 2, an essentially elliptical recess (not shown). This recess corresponds roughly to the recess provided in the cutting bit holder 7. The spacing disk 16 can thus be fitted onto the tool holder 2 in the same way as the cutting bit holder 7 could. The spacing disk 16 also has, on its side facing away from the tool holder 2, an essentially elliptical spigot 3', onto which the cutting bit holder 7 can be fitted. The tensioning screw 12, which is longer here than in the position shown in FIG. 4, can now attach both the spacing disk 16 and the cutting bit holder 7 to the tool holder 2. In the two fitting positions of the holder 7 shown in FIGS. 4 and 5, respectively, the cutting bit 11 is arranged at different respective positions, and it is generally necessary to optionally supply coolant and/or lubricant as directly as possible to the cutting edges of the cutting bit 11. Therefore, the boring head has two outlets 18, 19a for coolant and lubricant. In the fitting position shown in FIG. 4, the outlet 19a is closed by a headless screw 17. If the fitting position shown in FIG. 5 is now desired, the headless screw 17 is unscrewed from the outlet opening 19a and screwed into the outlet opening 18 instead. The coolant can now no longer pass through the outlet 18 out of the boring head, but rather solely from the outlet 19a, which lies directly alongside the cutting edge of the cutting insert 11 in FIG. 5. The position shown in FIG. 5 is provided for backward machining.

It can also be seen in FIGS. 4 and 5 that the boring head 1 has a stem part 15 which is provided for connection to the corresponding machine tool.

In the version of a boring head 1 shown in FIGS. 4 and 5, the boring head rotates about its central axis for the workpiece machining.

Figure 6:
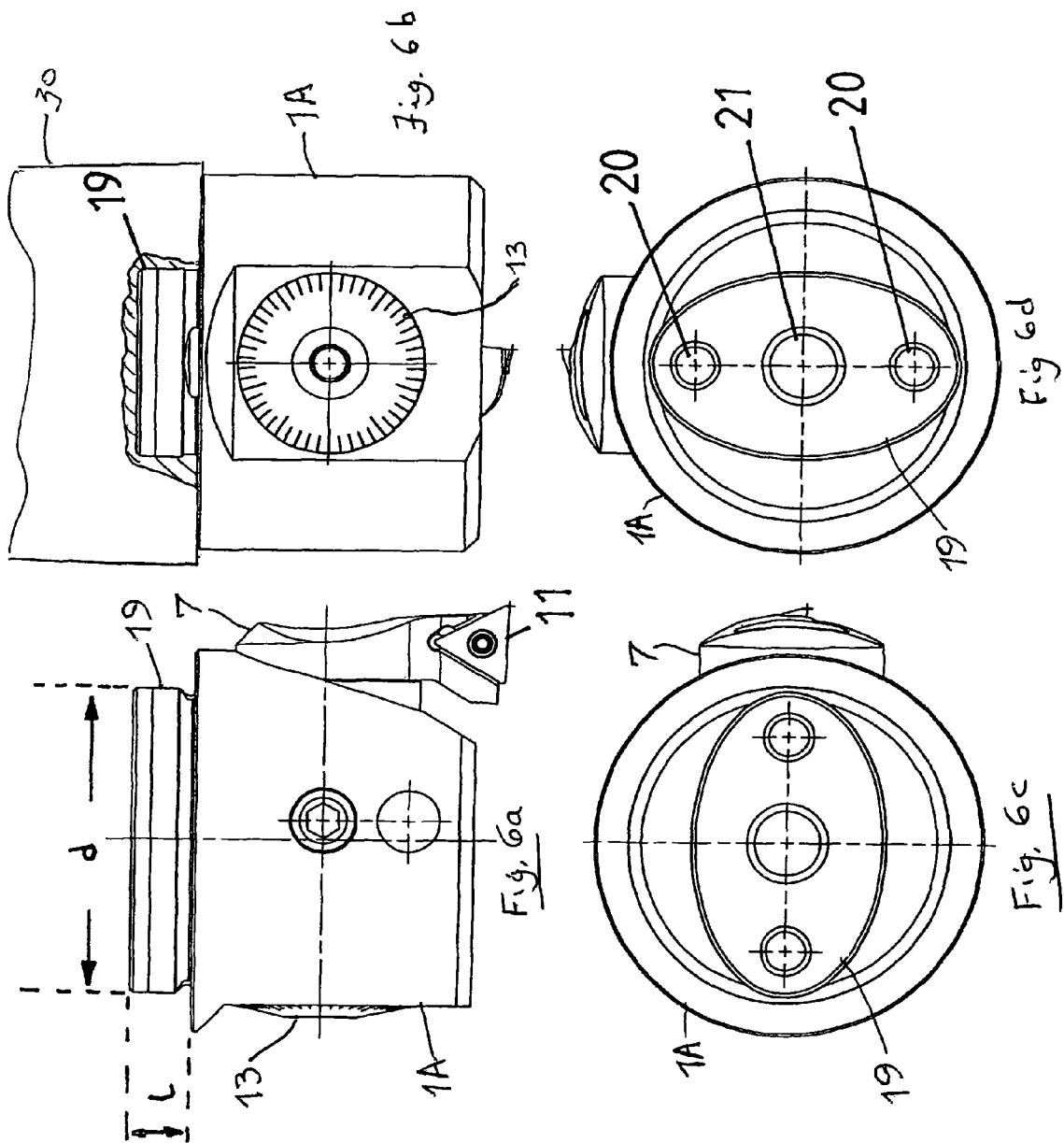
FIG. 6a is a side view of a modified boring head according to the invention.
FIG. 6b is a rear view of the boring head of FIG. 6a, taken from a different direction.
FIG. 6c is a front view of the boring head of FIG. 6a, FIG. 6d is a view similar to FIG. 6c after the boring head has been rotated by ninety degrees.
Figure 7:
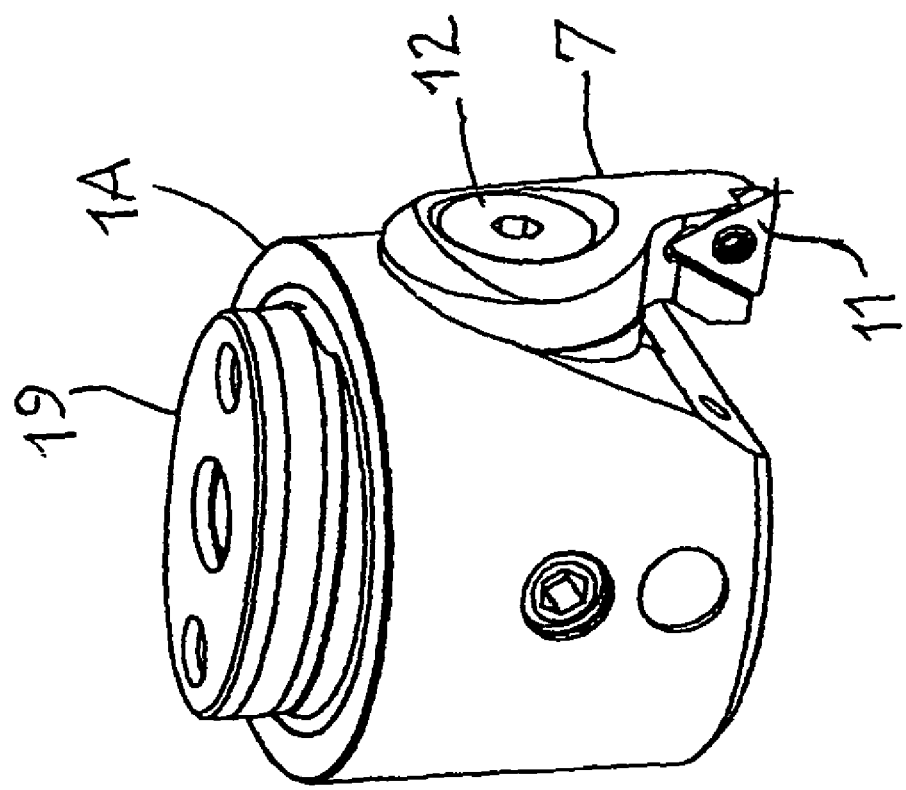
FIG. 7 is a perspective view of the second version of the boring head according to the invention.

In the case of machining very large bore radii, it is often expedient to design the boring head such that it rotates, not about its central axis, but about an eccentric axis spaced from the central axis. Such a boring head 1A is shown in FIGS. 6 and 7. With the help of this boring head, bores or holes with a radius that is clearly greater than the radius of the boring head illustrated in FIGS. 6 and 7 can be bored out. As it is also frequently a question, with this type of boring head, of providing a space-saving interface, an essentially elliptical projection or spigot 19 is provided here for the attachment to the machine tool 30 (whereby the boring head 1A and the machine tool 30 define first and second tool parts that are connected through use of a spigot/recess arrangement according to the invention). As can be seen in FIGS. 6a-6d, the elliptical spigot 19 is developed such that the ratio of the length l of the spigot to the maximum cross-section d of the spigot is less than 1. Here, too, the spigot is produced without oversizing, with the result that the connection comprising the elliptical spigot 19 and the corresponding elliptical recess at the machine tool 30 is provided merely for the orientation of the tool parts to each other and not for the transmission of force. Force is transmitted exclusively through the corresponding attachment means, which are here realized by two tensioning screws, which engage in threaded bores 20 in the spigot 19.

Furthermore, a central coolant channel opening 21 is provided here which serves to transfer coolant or lubricant from the machine tool into the boring head.

A perspective view of the second version of the boring head is shown in FIG. 7 by way of illustration.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. Connection system for producing an aligned connection between first and second tool parts, comprising:
    a spigot projecting from the first tool part, and a spigot-receiving recess formed in the second tool part for aligning the first and second tool parts to each other; and
    separate means for attaching the first tool part to the second tool part,
    wherein the spigot and the recess have correspondingly shaped, elliptical respective cross-sections, and the spigot and the recess are sized to enable the spigot to be completely inserted into the recess without expanding the recess or compressing the spigot, and
    wherein said first tool part is a boring head and said second tool part is a cutting bit holder, and
    wherein a central axis of the ellipse of the spigot is arranged perpendicular to a longitudinal axis of the boring head.

2. The connection system according to claim 1, wherein the cross-sectional size of the spigot is smaller than the cross-sectional size of the recess, so that the spigot is spaced inwardly from a surface defining the recess.

3. The connection system according to claim 1 wherein an outer end of the spigot is beveled.

4. The connection system according to claim 3 where an apex angle formed by the bevel is in the range of 1 to 10 degrees.

5. The connection system according to claim 4 wherein the apex angle is in the range of 1 to 5 degrees.

6. The connection system according to claim 4 wherein the apex angle is substantially 3 degrees.

7. The connection system according to claim 1 wherein the spigot has a length l and a longest cross-section d, the ratio l/d being less than 1.0.

8. The connection system according to claim 7 wherein the ratio l/d is less than 0.5.

9. The connection system according to claim 1, wherein the means for attaching includes a fastener for securing the tool parts together.

10. The connection system according to claim 9, wherein the fastener comprises a screw passing through a through-hole formed in one of the tool parts and threadedly attached in the other tool part.

11. The connection system according to claim 10 wherein the fastener extends along a common center axis of the spigot and the recess.

12. The connection system according to claim 1 wherein the first tool part includes a first flat bearing surface portion disposed adjacent the spigot, the second tool part including a second flat bearing surface portion disposed adjacent the recess and contacting the first bearing surface portion.

13. The connection system according to claim 1 wherein the connection system includes a spacing disk that is able to be placed between the first and second tool parts.

14. The connection system according to claim 1, wherein an outer end of the spigot is beveled, the bevel forming an apex angle in the range of 1 to 10 degrees, an inner portion of the spigot being of constant cross-section as seen in a section plane containing a center axis of the spigot.

15. The connection system according to claim 14, wherein the spigot has a length l and a largest cross-section d, the ratio l/d being less than 1.0.

16. The tool part connection system according to claim 15, wherein the ratio l/d is less than 0.5.

17. The tool part connection system according to claim 1, wherein the recess has a length l and a longest cross-section d, the ratio l/d being less than 1.0.

18. The tool part connection system according to claim 17, wherein the ratio is less than 0.5.

19. The connection system according to claim 1, wherein the means for attaching include a tensioning screw.

20. The connection system according to claim 1 wherein the boring head includes an outlet for conducting a fluid.

* * * * *